United States Patent [19]

Telle

[11] Patent Number: 5,555,099
[45] Date of Patent: Sep. 10, 1996

[54] REPRODUCTION APPARATUS AND METHOD WITH PROOF SET PAGE NUMBERING

[75] Inventor: Lawrence B. Telle, Greece, N.Y.

[73] Assignee: Eastman Kodak Company, Rochester, N.Y.

[21] Appl. No.: 353,034

[22] Filed: Dec. 9, 1994

[51] Int. Cl.$^6$ .................................................. H04N 1/00
[52] U.S. Cl. ......................... 358/401; 358/406; 358/474; 355/202; 355/203; 355/204
[58] Field of Search .................................... 358/400, 401, 358/406, 474, 498; 355/202, 203, 204, 308

[56] References Cited

U.S. PATENT DOCUMENTS

| 4,707,121 | 11/1987 | Sawaki et al. | 355/40 |
| 4,712,906 | 12/1987 | Bothner et al. | 355/3 TR |
| 5,109,252 | 4/1992 | Schott, Jr. | 355/202 |
| 5,113,222 | 5/1992 | Wilson et al. | 355/209 |

FOREIGN PATENT DOCUMENTS

WO90/07753 7/1990 WIPO .

*Primary Examiner*—Edward L. Coles, Sr.
*Assistant Examiner*—Thomas L. Stoll
*Attorney, Agent, or Firm*—Norman Rushefsky

[57] ABSTRACT

An apparatus includes an electronic scanner for scanning a set of original document pages to be reproduced as a production job. The scanner produces first signals representing image information on the document pages. An operator control panel (OCP) allows input of job and page level requirements for copying the set of documents pages as a copy job and generates second and third signals respectively representing these. A job image buffer is responsive to the first, second and third signals and stores fourth signals representing image information for use in reproducing the set of document pages. There is also provided a buffer for generating fifth signals representing consecutive numbers for use in annotating copies of the document pages. In response to the fourth and fifth signals, the copier produces a proof set of consecutively numbered hard copy pages of the set of document pages with consecutive numbered annotations not present on the original document pages. The apparatus then prompts the operator via a display screen to input a number on one of the consecutively numbered pages and an operator selectable page level requirement for changing a requirement for reproducing an original page in said set corresponding to said one page. After a proof set is formed, the original page having a requirement to be changed may be re-scanned. The copier then produces collated copy sets of the set of document pages as a copy job with the original page reproduced according to the changed requirement.

13 Claims, 6 Drawing Sheets

5,555,099

REPRODUCTION APPARATUS AND METHOD WITH PROOF SET PAGE NUMBERING

FIELD OF THE INVENTION

This invention pertains generally to an apparatus and method for producing sets of multipage documents such as by copying and more particularly to setting up a production job in which making of a proof copy is featured with the ability to make page level changes in the job.

BACKGROUND OF THE INVENTION

In known electronic copiers, a copy job is set up by the operator who inputs through a keyboard or other means the various features desired for making of the copies. Some of these copiers include the ability to set up a copy job having individual page level parameters or requirements different from other pages in the job; in this regard, reference is made to U.S. Pat. No. 5,113,222, the contents of which are incorporated herein by this reference, and to the KODAK 1575 Copier-Duplicator manufactured by Eastman Kodak Company.

A "proof" button on the copier allows the user to print one set and not print the remaining sets as specified on the copy quantity selection. This feature allows the user to review or "proof" his copy set for mistakes before the copier is given the go-ahead to produce the requested copy set count. This feature may often eliminate the need for throwing away extra copies of sets that are prepared improperly.

The copier may also include a large CRT that is capable of displaying the images of the copy set. When the operator requests a "proof" set, he can review the set while scrolling through the set on the CRT and make changes where needed. This feature does give strong reinforcement of location in the document set. Scrolling through images on the CRT of such a copier is very time consuming and a very expensive feature for a copier apparatus.

In U.S. Pat. No. 4,707,121, it is known to provide numbering on annotations of copies made from originals However, since an optical copier is described, there is no way of using these numbers to correct certain pages in a set of pages to be reproduced as a copy job.

It would, therefore, be desirable to provide a reproduction apparatus and method having a less costly and more productive alternative to requiring scrolling through images on a CRT to determine the need for making changes in the copying or printing requirements for individual pages.

SUMMARY OF THE INVENTION

This and other objects of the invention which will become apparent after reading this specification are realized by a copier method and apparatus, comprising scanning means for electronically scanning a set of original document pages to be reproduced as a production job and producing first electrical signals representing image information on the document pages; means for inputting operator selectable job level requirements for copying the set of documents pages as a copy job and generating second signals representing said job level requirements; means for inputting operator selectable page level requirements for reproducing selected pages of the set and generating third signals representing page level requirements; means responsive to the first, second and third signals for electronically storing fourth signals representing image information for use in reproducing the set of document pages; means for generating fifth signals representing consecutive numbers for use in annotating copies of the document pages; means responsive to the fourth and fifth signals for producing a proof set of consecutively numbered hard copy pages of said set of document pages with consecutive numbered annotations not present on the original document pages; means for inputting a number on one of said consecutively numbered pages; means responsive both to an input of said number on said one page and an operator selectable page level requirement for changing a requirement for reproducing an original page in said set corresponding to said one page; means for operating said scanning means to electronically scan said original page having a requirement to be changed; and means for producing collated copy sets of the set of document pages as a copy job with the said original page reproduced according to the changed requirement.

In accordance with another aspect of the invention, there is provided a reproduction method and apparatus, comprising means for inputting operator selectable job level requirements for producing a production job comprising plural collated copies of a set of pages of a multipage document and generating first signals representing said job level requirements; means for inputting operator selectable page level requirements for producing selected pages of the set and generating second signals representing page level requirements; means for electronically storing in rasterized form in a buffer memory third electrical signals representing image information on the multipage document; means external to said buffer memory for generating fourth signals representing page order identifying indicia for use in annotating a hard copy proof set of the multipage document; means responsive to the second, third and fourth signals for producing the hard copy proof set with printed page order identifying indicia not present on the image information on the multipage document as stored in the buffer memory; means for a generating fifth signals identifying one page of said multipage document; means responsive both to said fifth signals and a sixth signal representing an operator selectable page level requirement for changing a requirement for producing copies of said page in said set; and means responsive to said first, third and sixth signals for producing collated copy sets of the set of the multipage document as a production job with copies of the said one page reproduced according to the changed requirement.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

The present description will be directed in particular to elements forming part of, or cooperating more directly with, apparatus in accordance with the present invention. It is to be understood that elements not specifically shown or described may take various forms well known to those skilled in the art.

Figure 1:
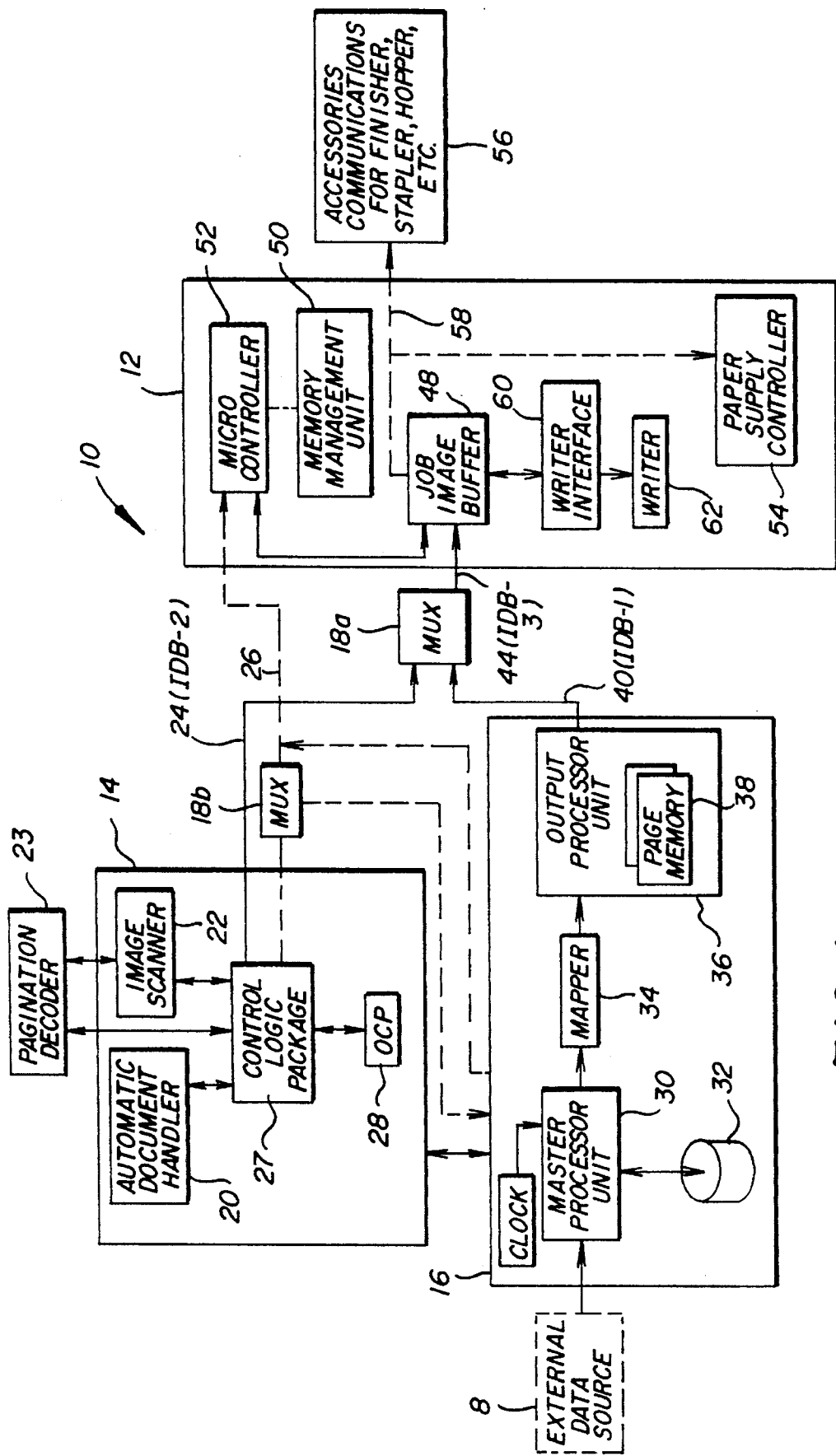
FIG. 1 is a schematic block diagram of one embodiment of reproduction apparatus programmed in accordance with the invention.
Figure 2:
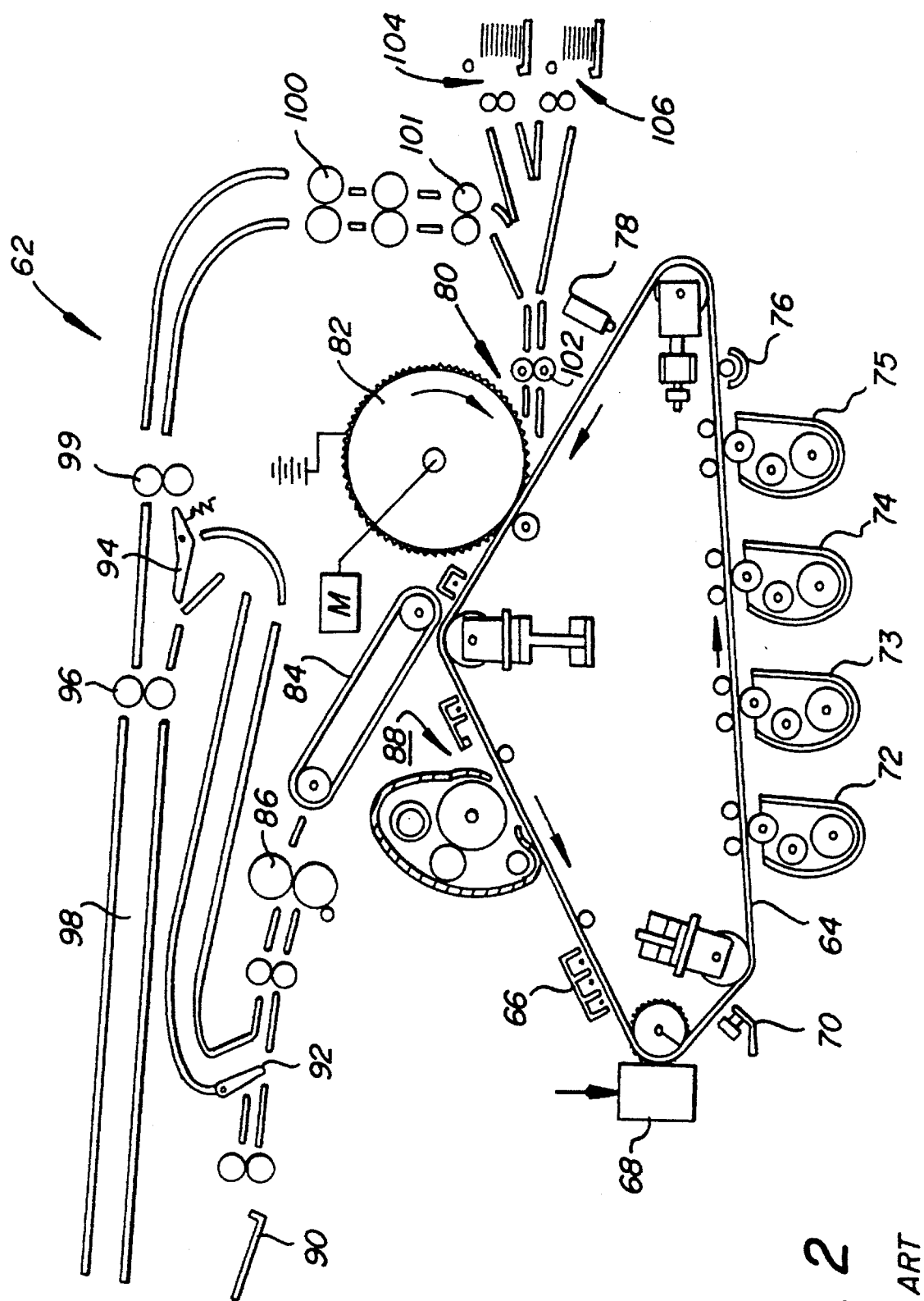
FIG. 2 is a diagram of a multi-color electrostatographic writer forming a part of the reproduction apparatus of the invention.

According to FIGS. 1 and 2, a copier/printer reproduction apparatus 10 is shown that includes a marking engine 12, a scanner 14, a raster image processor (RIP) 16, and multiplexers 18a and 18b, for selecting or multiplexing respective inputs to the marking engine 12.

The term "copy job" is used in its conventional sense and implies operation of the apparatus in a copier mode to produce one or more hard copy sets from a production job requiring copying of an original document having one or more hard copy pages in accordance with predetermined parameters requested for producing said copy sets.

The term "print job" is used in its conventional sense and implies operation of the apparatus in a printer mode to produce one or more hard copy sets from a production job requesting printing of data in accordance with predetermined parameters requested for producing said copy sets.

A typical copy job represents a request to copy a page or a sequence of pages. Where it represents a sequence of pages, the pages will be collated as a group or output finished such as by stapling.

An original document reader such as scanner 14 is arranged for producing a series of electrical signals representative of the image content of original document sheets. Scanner 14 consists of an automatic document handler 20 for stream feeding in serial fashion hard copy original pages to a platen or scanning station to be automatically read by an image scanner 22 such as a linear array of solid state charge-coupled devices. In lieu of feeding document sheets to the platen, documents such as books or sheets may be placed on the platen. The solid state device scans the original pages, converting their images to a series of electrical signals in page format for input to a buffer memory forming part of the image scanner 22. In response to a signal from the RIP 16 to the multiplexer 18a, the image data and signals identifying separate scan lines are transmitted along an image data bus 24 (IDB-2) to the marking engine 12 via multiplexer 18a. Signals representing coded messages and providing page information and other marking engine control information identifying requirements for the job are transmitted along a job control communications link 26 to the marking engine 12. When the RIP 16 is operative, a multiplexer 18b causes these messages to be sent to the RIP and then from the RIP to the marking engine. When the RIP is non-operating, messages form the scanner are sent via the multiplexer 18b directly to the marking engine 12.

Figure 5A:
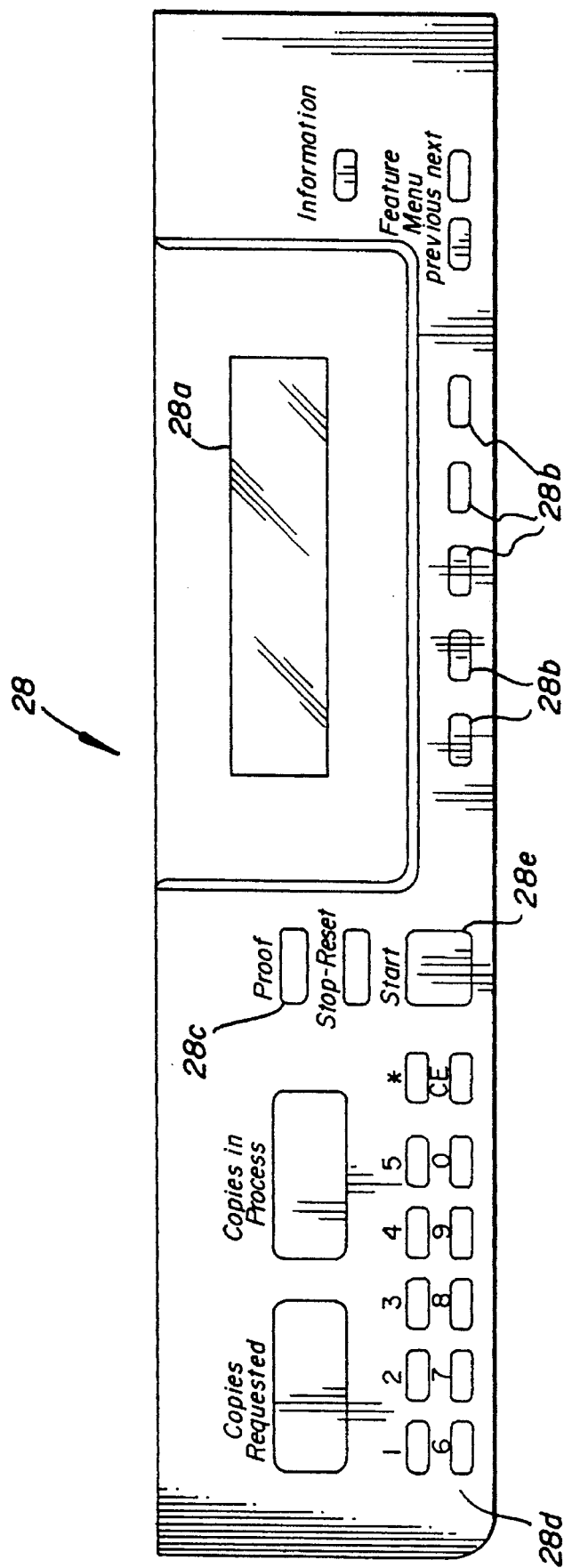
FIG. 5A and 5B are illustrations of an operator control panel used on the aforementioned KODAK 1575 Copier-Duplicator and which may be also used on the reproduction apparatus of the invention.
Figure 5B:
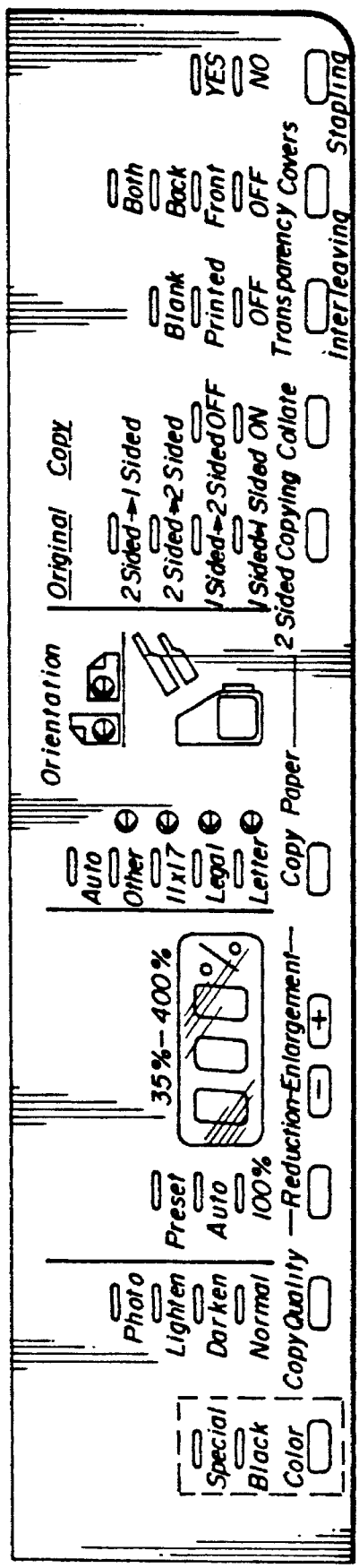

Scanner 14 includes a control logic package 27 having an operator control panel (OCP) 28 (see FIGS. 5A and 5B) for the operator to input functions using keys and a display 28a to allow the operator to receive messages from the reproduction apparatus. Setup instructions for a copy job including job level and page level requirements are input by the operator using the OCP and the signals representing job level and page level requirements are interpreted by the control logic package which then sends coded messages via link 26 for finishing and processing to the marking engine 12. The logic package consists of control software, interface software and logic and computer hardware including memory. Functions inputted by the operator at the control panel provide for operation of the apparatus in various copying modes well known in the prior art to perform various copying jobs in accordance with the inputted parameters for each copy job. Such functions might include simplex or duplex copying, magnification or reduction number of copies, image editing, etc. In the copier mode, the copier/printer functions as a conventional electronic copier and jobs are scanned in the scanner 14 using a feeder to circulate same and generate a rasterized signal of the image information on the documents. The scanned image data is stored in a page buffer that forms a part of image scanner 22 and upon connection of image data bus-2 (24) to image data bus-3 (44) by multiplexer 18a the image data is transferred to a job image buffer (JIB) 48. Also transferred to the microcontroller 52 are job control data. In JIB 48, the scanned image information data is compressed, stored in the JIB's memory and then expanded when the frame to be printed is in a position synchronized with the data for sending the data to writer 62 for recording same on the charged photoconductive web 64 by selectively enabling LEDs on an LED printhead. Further details relative to the JIB are described in international published application WO 90/07753, the contents of which are incorporated herein by this reference.

Figure 3:
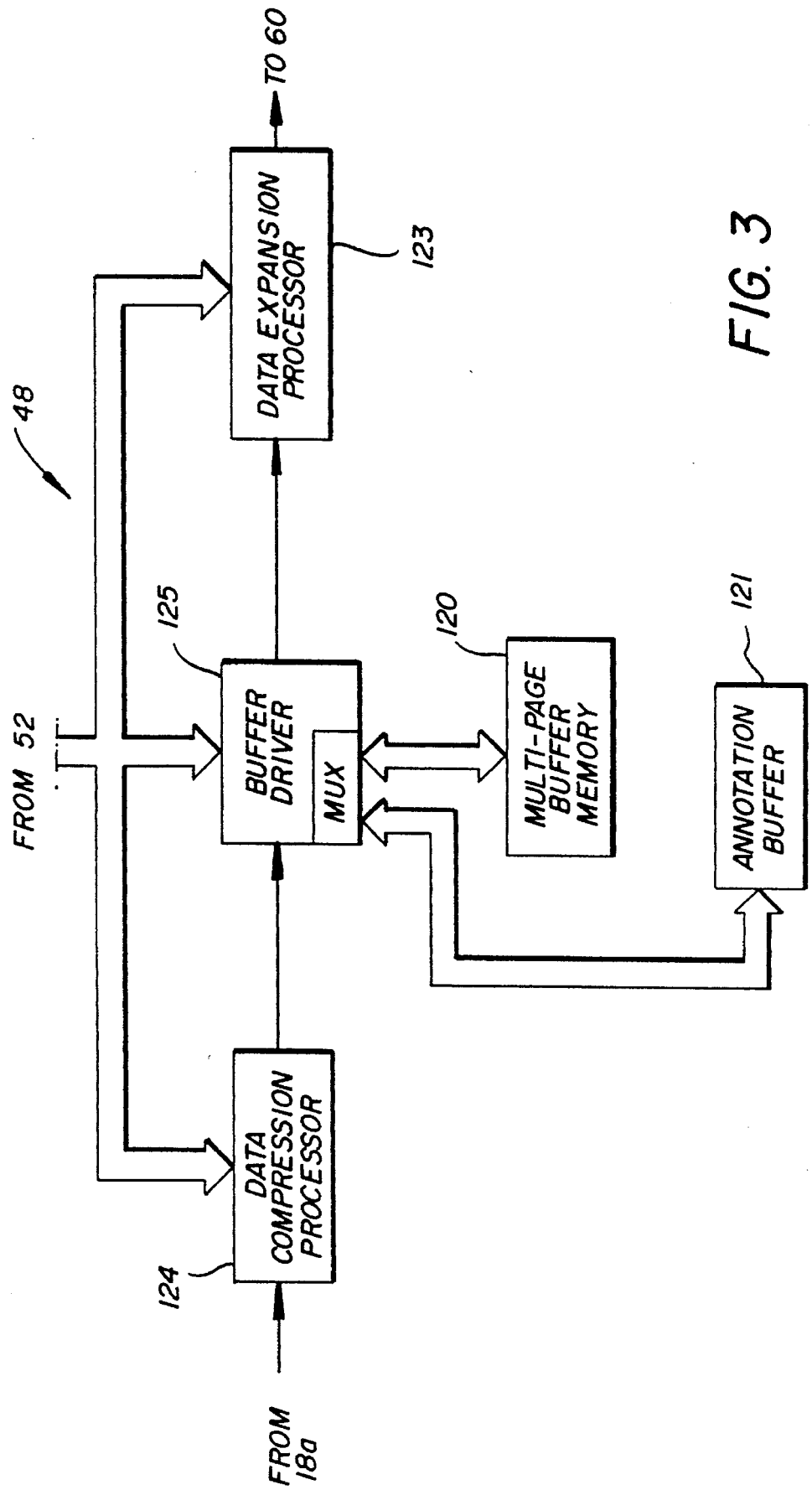
FIG. 3 is a schematic of a job image buffer that forms a part of the reproduction apparatus of the invention.

With reference now to FIG. 3 the JIB 48 includes a multi-page buffer memory 120 for storing compressed data representing one or more copy jobs to be printed. There is also included a JIB VIEW or annotation buffer memory 121 wherein, the term VIEW represents variable information electronic writing. In this JIB VIEW buffer memory data for writing characters are stored as well as other data known in the prior art for annotating copies such as date, time, etc. In lieu of a storage device, a controller may generate this information from software or it may be generated by dedicated circuits.

With reference now to FIG. 1, raster image processor 16 includes a master processor unit 30 which receives high level commands and data in character code or other form from an external electronic data source 8 which may be one or more of a main frame computer, network link, telephone link, data processing work station, facsimile receiver, removable memory media, or the like. The commands are translated into machine control language by the master processing unit 30. A job buffer 32 stores incoming jobs and program codes for use by the master processing unit.

After interpreting a job, master processing unit 30 parcels the job to a mapper 34, which converts the character code data to a pixel pattern map. For color prints, the mapper separates the information into four raster patterns, one for each color available at marking engine 12.

When the pixel pattern map is rasterized, mapper 34 sends page information to an output processor unit 36. The output processor unit has page memory 38, which stores image planes for transmission to the marking engine 12.

The processed image data and signals identifying separate raster lines are transmitted along an image data bus 40 to multiplexer 18a. Signals representing coded messages that provide page information and other marking engine control information are transmitted along the job control communications link 26.

The marking engine 12 receives bit stream image data over a bus 44 and job control data over the communications link 26. The image data is stored in the JIB's buffer which is a multiple page buffer memory 120 under the control of a memory management unit 50.

Control means, including a micro controller 52 having one or more microprocessors, is arranged to perform arithmetic and logic operations and instruction decoding for operation of the marking engine 12 as well as controlling the time allocation of peripherals (such as a paper supply controller 54 and accessories 56) through a machine control communications link 58. Several output functions (not shown) may be available for receiver sheets, including selection of output trays, stapling, sorting, folding, finishing, mailbox, envelope receiver, etc. Programming of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

After appropriate processing, the data is input to a writer interface 60 and an LED writer 62 for forming images on receiver sheets. The details of the writer are not essential parts of this invention but should be considered exemplary of one form of the writer, wherein others may also be used.

According to FIG. 2, the LED, laser or other type of writer 62 of marking engine 12 includes an image bearing member, for example, either a drum or preferably an endless electrophotoconductive web 64 entrained about a series of primary rollers and other supporting structure. Web 64 is driven by a motor driven roller through a series of electrophotographic stations generally well known in the art. More specifically, a uniform charge is laid down on the web by a charging station 66. The uniformly charged web moves around one of the rollers, which is directly opposite an LED printhead 68 which LED printhead selectively image-wise exposes web 64 in a manner well known in the art to form an electrostatic latent image. The web then moves into operative relation with an electrometer 70 which senses the level of a charge existing after exposure of the web by printhead 68, to help control the process.

The web then moves into operative relation with a series of toning or developing stations 72, 73, 74 and 75. Each image created by printhead 68 is toned by one of the toning stations. After being toned, the web passes a magnetic scavenger 76 which removes excess iron particles picked up in the toning process. After the electrostatic image has been toned, the web passes under densitometer 78 which measures the density of the toner image also for use in controlling the process. The toner image then proceeds to a transfer station 80 where the image is transferred to a transfer surface of a receiver sheet carried by a transfer drum 82.

As thoroughly discussed in U.S. Pat. No. 4,712,906, consecutive images in different colors are transferred in registry to a receiver sheet. The receiver sheet is wrapped on transfer drum 82 and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum. Since the short dimension of letter size sheets is approximately half the long dimension of ledger size sheets, two letter size sheets are placed on the drum in approximately the same space as the single ledger size sheet. When the apparatus is operating in a multi-image mode, for example, a multi-color mode, consecutive images or pairs of images are toned with different colored toners using the different toning stations 72–75. These consecutive images are transferred in register to the receiver sheet as it repeatedly is brought into transfer relation with web 64 by drum 82. After the transfer operation is complete, the receiver sheet is allowed to follow the web, for example, by removing the vacuum holding it to drum 82 or by stripping the sheet with a skive, or other conventional stripping mechanism or both. The receiver sheet is separated from the web with the aid of an electrostatic sheet transport mechanism 84 and is transported to a fuser 86. The web is then cleaned by the application of a neutralizing corona and a neutralizing erase lamp and a magnetic brush cleaning mechanism all located at a cleaning station 88.

After the receiver sheet leaves fuser 86 it can go directly to an output tray 90 or be deflected by a deflector 92 into a duplex path according to the position of deflector 92, the position of which is controlled by the logic of the apparatus through means not shown. The duplex path moves the sheet by rollers and guides directing it first through a passive deflector 94 into turn-around rollers 96. Turn-around rollers 96 are independently driven to drive the receiver sheet into turn-around guide means 98, until the trailing edge thereof has been sensed by an appropriate sensor, not shown, to have passed passive deflector 94. Once the trailing edge has passed passive deflector 94, turn-around rollers 96 are reversed and the receiver sheet is driven by rollers 96 and other sets of drive rollers 99, 100, and 101 back to a position upstream of transfer station 80. The receiver sheet cart pass through registration mechanism for correcting for skew, cross track misalignment and intrack misalignment and ultimately stop at timing rollers 102.

Transfer station 80 receives sheets from any of three sources. First, it can receive sheets of one particular size from a first supply 104, which first supply may include, for example, letter size sheets being fed with their short dimension parallel with the direction of feed. Second, it may receive sheets from a second supply, 106, which, for example, may include ledger size sheets with their long dimension parallel to the direction of movement. Third, the transfer station may receive sheets from the duplex path which may include either size sheet and would already contain a fused image on its upper side. The receiver sheets from whatever source, stop against timing rollers 102. In response to a signal from the logic and control of the apparatus, not shown, timing rollers 102 accelerate to drive the receiver sheet into the nip between the transfer drum 82 and the web as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to output tray 90 are in the correct order considering the number of sheets that must be in the duplex path.

In operation of the copier mode, control logic package 27 starts in a sub-routine pre-programmed according to the switches on control panel 28 to command scanner 14 to begin operation. Automatic document handler 20 is activated to move seriatim document sheets into an exposure station of image scanner 22.

As the scanning of the document sheets progresses, data (including image information and control signals) are received by job image buffer 48. As subsequent original document sheets am scanned, the processes described above are repeated until all of the original document sheets have been scanned and the data therefrom stored in job image buffer 48.

One function of a multiple-page job image buffer memory 120 is to store all the pages of a particular job as rasterized image data so that plural sets of collated pages may be produced without re-scanning or re-rasterizing image data the set of originals for each set produced. Note that as used herein storage of data that has been rasterized and then compressed to a compressed rasterized form is also considered to be broadly speaking in a rasterized form. Thus, data for each page in a copy set to be printed is sent to the writer interface 60 and, after the copy set is printed, data for each page in a second copy set is sent to the writer interface. Thus collated copy sets can be printed even without use of a sorter. As such, automatic document handler 20 need not be capable of recirculating the originals.

In a standard "copier" mode of operation, the latent images imaged by the LED printhead are aligned on web 64 such as to allow an orderly repetitive process of exposure and transfer to receiver sheets. Documents are sequentially imaged onto the photoconductive surface with consistent reference to frame marks on the web.

Figure 4:
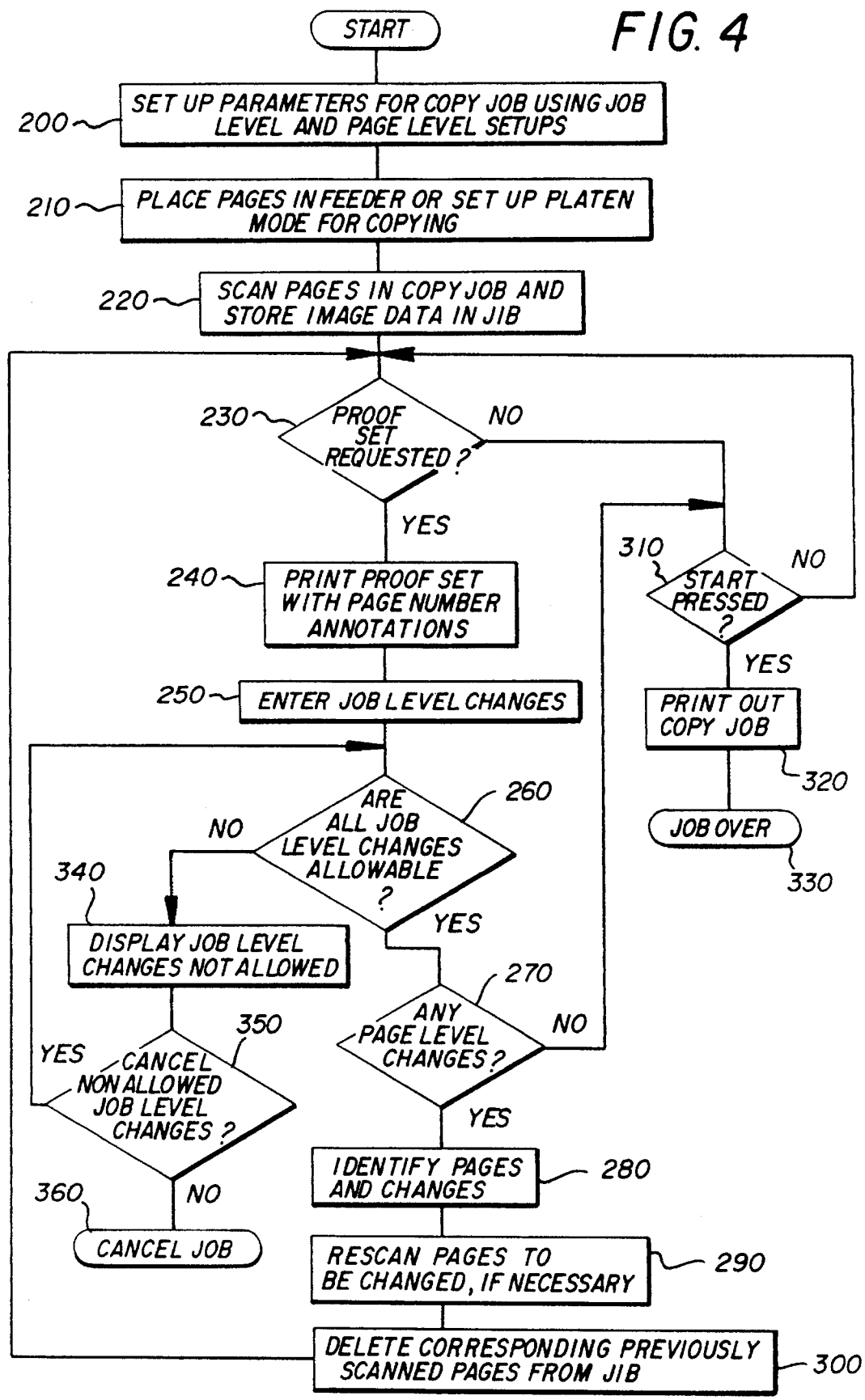
FIG. 4 is a flowchart illustrating operation of the reproduction apparatus in accordance with the invention.

With reference now also to the flowchart of FIG. 4, new production jobs are input to the copier/printer either as a copy job, wherein the scanner is used to input the data to be printed by the marking engine, or as a print job where electronic print jobs are input via a computer through input to the copier/printer's raster image processor. The apparatus may be operated in a copier-only mode wherein printer jobs are locked out or in a printer-only mode wherein copier jobs are locked out. However, in a copier/printer mode of operation, print jobs may be sent to the JIB 48, one job at a time to allow room in the JIB memory for copy jobs that may be input. Copy jobs may be input as normal production jobs wherein plural jobs are stored and they are output to the writer on a FIFO basis after completion of a print job currently being printed. A display 28a associated with the operator control panel (OCP) 28 includes one or more-soft keys 28b allowing an operator to set up parameters or requirements (step 200)for a next copy job including page level setups while a current copy job or print job is printing and to allow the next job representing copying of document pages placed in a feeder tray or placed individually on the platen (step 210) to be scanned in (step 220). Alternatively, the marking engine need not be printing while the parameters for this next copy job are being input. The original document sheets forming this job may be placed in the copier's feeder tray or scanned individually off of the platen (step 210). The soft key may be identified as "next job setup" for setup during production of a current copy job and "copy job setup" during production of a current print job, which is a job that is derived from the external data source 8. After being scanned in by the scanner, the image data for this copy job is stored in the JIB (step 220). The OCP also includes a hard or soft key 28c allowing an operator, upon actuation of the key, to print a proof set (step 230) with page number annotations. In printing this proof set, data for each page that forms part of this copy job is, in response to signals from micro controller 52 output, in an appropriate order: i.e. first page first or last page first. The data is output to one input of the buffer driver 125. A second input is provided for data output by the annotation buffer 121. The driver includes either a logic combining operation or a gating operation. This is either hardwired or software operated. In its simplest form the logic circuit may provide a logic "OR" operation so that the annotation data can be written into small areas expected to merely contain white background only. In a more sophisticated approach, the circuit may be a gated circuit, such as a multiplexer (MUX), as described below. The buffer driver 125 receives signals from the memory management unit which also controls a data compression processor 124 and the data expansion processor 123. Data that is output from the JIB annotation buffer 121 corresponds to numerical character(s)correlating with the scanned image page. Typically, this annotation data can be sequenced to be presented to the circuit with data representing an area of the copy sheet where no data is expected to be present, such as at the top or bottom of a page or in a corner of the page. Thus, the buffer driver can affect a gating signal to be applied to the multiplexer circuit so that when data for a particular area of a page where pagination information is to be provided, image data from the document is blocked. Alternatively, for areas of a page where pagination information is not to be provided, the pagination (annotation) information is blocked and the image data from the multi-page buffer memory 120 for that page is passed. The above repeats for each printed page of the document sheet formed for this proof job and represents the number of document sheets scanned in this copy job. The only difference is that each printed page receives a different number in consecutive order, e.g. 1, 2, 3, 4 . . . N, wherein N represents the number of document sheets scanned for this copy job. Thus, a proof set is printed with page number annotations (step 240). Since the copier may be printing the current production job, the request for a proof set may be handled as an interrupt whereupon production of the current job is halted with the microcontroller storing information as to where to begin the current production job after proof copying is completed. Known copiers having a capability to form a proof set provide output to a location, e.g., a top tray, that is different from that provided for the current production job. The data for the annotation data may be stored in compressed form in accordance with the schematic as illustrated in FIG. 3 or expanded form in which case the logical combination thereof with page memory data can be after expansion of the page memory data; i.e., after data is output from the processor 123. Alternatively, the data may be generated by a computer counter when needed. Where a counter is used the pagination data may be output in ASCII code and then rasterized and combined with rasterized image data output from the data expansion processor.

After the operator has had an opportunity to review the proof copies, the operator may wish to make job level changes (step 250) or page level changes (step 270). If the operator inputs certain job level changes that are not allowed, a display (step 340) on the OCP will note which changes are not allowed, since these typically will require rescanning of the entire document set of this copy job. A prompt on the display allows the operator to either cancel the non-allowed job level change (step 350) or cancel the job (step 360). Examples of job level features which may be changed include one-sided to two-sided output, transparency interleaving, requested number of copies, image shift, paper supply, collate/non-collate, stacking, stapling and folding. Examples of features which on some copier/printers may not be changed on a job level include color, copy quality (light-dark setting), reduction/enlargement, etc. Assume page level changes are desired, for example making one of the pages to be printed darker. The operator maybe prompted by prompts from the OCP's display screen to enter job level changes and then when complete to enter page level changes. However, in order to enter page level changes the operator is prompted to indicate via a numerical keypad 28d on the OCP, a page number using the annotated number printed on the first page to be changed and to input the page level change(s) such as, for example, to select a different lighten/darken setting on the OCP for reproducing this page (step 280). If rescanning is necessary the operator is then prompted by the OCP's display screen to place the document sheet for which a change is requested on the platen or in the feeder, and to press proof button 28c or to press a soft key indicating "proof page". In response to pressing this button a signal is generated to cause the original page to be rescanned by the scanner and the data for the page for this scan is processed according to the change(s) requested (step 290). The microcontroller causes the memory management unit to reset the pointers for this page so that it now points to the new location where this page is stored in memory. Effectively, the data for the page whose pointers have been deleted is not retrievable for printing (step 300). Alternatively, the data for this page as previously scanned may be deleted. After this page is scanned a prompt on the display requests input for any additional pages to be changed and if there are, the process repeats of identifying the page, inputting the changes, and rescanning the document sheet to be changed.

When all the pages to be changed have been rescanned the operator can request a second proof set or if no further proof sets are desired he may press the START button 28e (step 310) on the OCP and print out the copy job for the number of copies requested (step 320) until the copy job is over (step 330). In printing of the copy sets the microcontroller causes the copies of each copy set to be printed in consecutive order in accordance with the copy requirements set up by the operator and uses the pointers for the new scanned-in pages to point to locations in memory where the image data for these sheets may be found for printing of each set of copies that are requested.

In lieu of the operator entering the page number of the page whose copying requirements are to be changed, during rescanning of the page the annotated page number may be recognized through an optical character recognition (OCR) reader and the detected page number input to the CLP 27. In lieu of printing page number characters, a bar code or other character or indicium may be printed on the page representing page order. These characters or codes may be considered "page order identifying indicia." The pagination decoder 23 may include an OCR reader, bar code detector or other equivalent device for detecting the page order identifying indicia on scanned-in pages.

The invention also has similar utility for providing page number identifying indicia on a proof set of a multipage document to be printed as a print job. The flow chart for processing such a document would be similar to that shown in FIG. 4 except that in steps 210 and 220 the document would be output by the external data source to the RIP 16 and the now rasterized data for the print job stored in the JIB 48. If page level printing requirements for a particular page are required to be changed, and it is necessary to remove the page from the JIB memory, the data for that page may be output again from the external data source 8 and rasterized according to the new page level printing requirements by RIP 16. The rasterized data for this page is then output to the JIB memory. During production of collated copy sets of the print job using the data stored in the JIB's memory the collated sets of the multipage document are printed without the annotation.

There is thus provided an improved reproduction apparatus and method for making collated copies of a set of document sheets wherein there is facilitated the identification of pages requiring changes from original setups. While the apparatus has been disclosed with reference to an electrophotographic marking engine other marking engines may be used including ink jet, electrographic, thermal printers, etc.

The invention has been described in detail with particular reference to preferred embodiments thereof, but it will be understood that variations and modifications can be effected within the spirit and scope of the invention as set forth in the claims.

What is claimed is:

1. A copier apparatus, comprising:

scanning means for electronically scanning a set of original document pages to be reproduced as a production job and producing first electrical signals representing image information on the document pages;

means for inputting operator selectable job level requirements for copying the set of document pages as a copy job and generating second signals representing said job level requirements;

means for inputting operator selectable page level requirements for reproducing pages of the set and generating third signals representing page level requirements;

means for generating fourth signals representing consecutive numbers for use in annotating a hard copy proof set of pages of the set of original document pages;

means responsive to the first and fourth signals for producing the hard copy proof set of pages of said set of original document pages with the hard copy proof set of pages additionally including consecutive numbered annotations, the annotations not being present on the original document pages;

means for inputting a number present as an annotation number on one page of the previously produced hard copy proof set of pages;

means responsive both to an input of said number on said one page and a new operator selectable page level requirement for changing a requirement for reproducing a corresponding original page in said set of original document pages;

means for operating said scanning means to electronically rescan said corresponding original page and generating fifth signals representing image information on said corresponding original page; and means, responsive to the first, second, third and fifth signals for producing collated copy sets of the set of document pages as a copy job with the said corresponding original page reproduced according to the changed requirement.

2. The apparatus of claim 1 and wherein said means for inputting a number is a numerical key pad.

3. The apparatus of claim 1 and wherein said means for inputting a number includes a means for scanning a page of said proof set and generating signals representing an annotated number on said page.

4. A reproduction apparatus, comprising:

means for inputting selectable job level requirements for producing a production job comprising plural collated copies of a set of pages of a multipage document and generating first signals representing said job level requirements;

means for inputting operator selectable page level requirements for producing selected pages of the set and generating second signals representing page level requirements;

means for electronically storing in rasterized from in a buffer memory third electrical representing image information on the multipage document;

means external to said buffer memory for generating fourth signals representing page order identifying indicia for use as an annotation for annotating a hard copy proof set of the multipage document;

means responsive to the second, third and fourth signals for producing the hard copy proof set with an annotation of printed page order identifying indicia, the annotation not being present on the image information on the multipage document as stored in the buffer memory the indicia being useful to identify to the apparatus one page in the set of pages of the multipage document;

means for generating fifth signals identifying said one page in said set of pages of the multipage document;

means responsive both to said fifth signals and a sixth signal representing an operator selectable page level requirement for changing a requirement for producing copies of said one page in said set of pages of the multipage document; and means responsive to said first, third and sixth signals for producing collated copy sets of the set of pages of the multipage document as a production job copies of the said one page reproduced according to the changed requirement.

5. The apparatus of claim 4 and wherein said means for generating fifth signals is a numerical key pad.

6. The apparatus of claim 4 and wherein said means for generating fifth signals includes a means for scanning a page of said proof set and for generating said fifth signals as signals representing a page order identifying indicium on the page.

7. The apparatus of claim 6 and including scanning means for scanning image information on the page.

8. A copier method, comprising:

inputting operator selectable job level requirements for copying a set of document pages as a copy job and generating first signals representing said job level requirements;

inputting operator selectable page level requirements for reproducing selected pages of the set and generating second signals representing page level requirements;

electronically scanning a set of original document pages to be reproduced as a production job and producing third electrical signals representing image information on the document pages;

generating fourth signals representing consecutive numbers for use in annotating a hard copy proof set of pages of the set of original document pages;

in response to the first and fourth signals producing the hard copy proof set of pages of said set of original document pages with the hard copy set of pages additionally including consecutive numbered annotations the annotations not being present on the original document pages;

inputting a number present as an annotation number on one page of the previously produced hard copy proof set of pages;

in response both to an input of said number on said one page and a new operator selectable page level requirement changing a requirement for reproducing a corresponding original page in said set of original document pages;

operating said scanning means to electronically rescan said corresponding original page and generating fifth signals representing image information on said corresponding original page; and producing, in response to the first, second, third and fifth signals collated copy sets of document pages as a copy job with the said original page reproduced according to the changed requirement.

9. The method of claim 8 and wherein said step of inputting a number is carried out by operation upon a numerical key pad.

10. The method of claim 8 and wherein said step of inputting a number is carried out in response to scanning of said one page.

11. A reproduction method, comprising:

inputting operator selectable job level requirements to a reproducing apparatus for producing a production job comprising plural collated copies of a set of pages of a multipage document and generating first signals representing said job level requirements;

inputting operator selectable page level requirements to the reproduction apparatus for producing selected pages of the set and generating second signals representing page level requirements;

electronically storing in rasterized form in a buffer memory forming a part of the reproduction apparatus third electrical signals representing image information on the multipage document;

generating fourth signals representing page order identifying indicia for use as an annotation for annotating a hard copy proof set of the multipage document;

in response to the second, third and fourth signals using the reproduction apparatus to produce the hard copy proof set with an annotation of printed page order identifying indicia the annotation not being present on the image information on the multipage document as stored in the buffer memory, the indicia being useful to identify to the reproduction apparatus a page in the set of pages of the multipage document;

generating fifth signals identifying said one page in the set of pages of the multipage document;

in response both to said fifth signals and a sixth signal representing an operator selectable page level requirement changing a requirement for producing copies of said page in said set; and in response to said first, third and sixth signals producing collated copy sets of the set of multipage document as a production job with copies of the said one page reproduced according to the changed requirement.

12. The method of claim 11 and wherein said fifth signals are generated by operation upon a numerical key pad.

13. The method of claim 11 and wherein said fifth signals are generated by scanning said page of said proof set.

* * * * *